July 23, 1957  G. W. JONSON  2,800,038
LENS TURRET INDEXING AND LOCKING MEANS
Filed June 18, 1956  4 Sheets-Sheet 2

GUSTAVE W. JONSON,
INVENTOR.

Gustave W. Jonson,
INVENTOR.

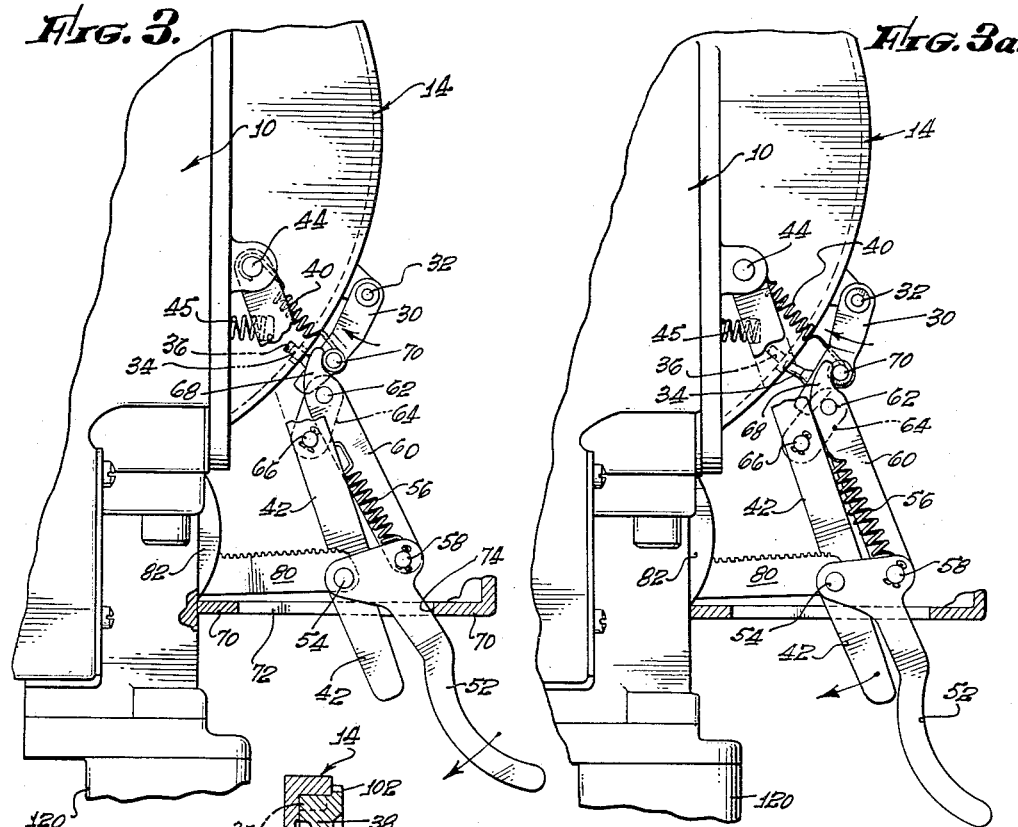

United States Patent Office 2,800,038
Patented July 23, 1957

1

2,800,038

LENS TURRET INDEXING AND LOCKING MEANS

Gustave W. Jonson, North Hollywood, Calif., assignor to Mitchell Camera Corporation, Glendale, Calif., a corporation of Delaware Application June 18, 1956, Serial No. 591,877

7 Claims. (Cl. 74—822)

The present invention relates to the shifting and registration of lens turrets such as are commonly used in motion picture cameras.

Motion picture cameras of the present day are commonly equipped with a plurality of photographing lenses, and usually also of finder lenses, carried in a rotatable turret. Any selected lens, or set of lenses, is settable in position on the optical axis or axes by rotating the turret and locking it in position. That operation is of course much quicker than the older method of lens substitution which required the removal of one lens from the mount and then setting the selected lens in the same mount. But certain categories of present day photography call for still quicker lens substitution; and it is the general object of the present invention to provide a simple and reliable turret shifting and registering mechanism by which a lens turret can be shifted for lens substitution extremely quickly and infallibly locked in registered position. The present invention accomplishes that objective, and enables the operator to shift and register the lens turret all as a result of a single simple finger movement which can be made without the operator taking his eye off the finder.

The invention will be best understood from the following description of the illustrative embodiment shown in the accompanying drawings, in which:

Figs. 3, 3a and 3b are enlarged details showing three typical positions of the finger operated mechanism, viewed from the rear, in the aspect indicated by line 3—3 on Fig. 2;

Fig. 4 is an enlarged section on line 4—4 of Fig. 1;

Fig. 5 is an enlarged fragmentary detail section on lines 5—5 of Figs. 1 and 4;

Figure 1:
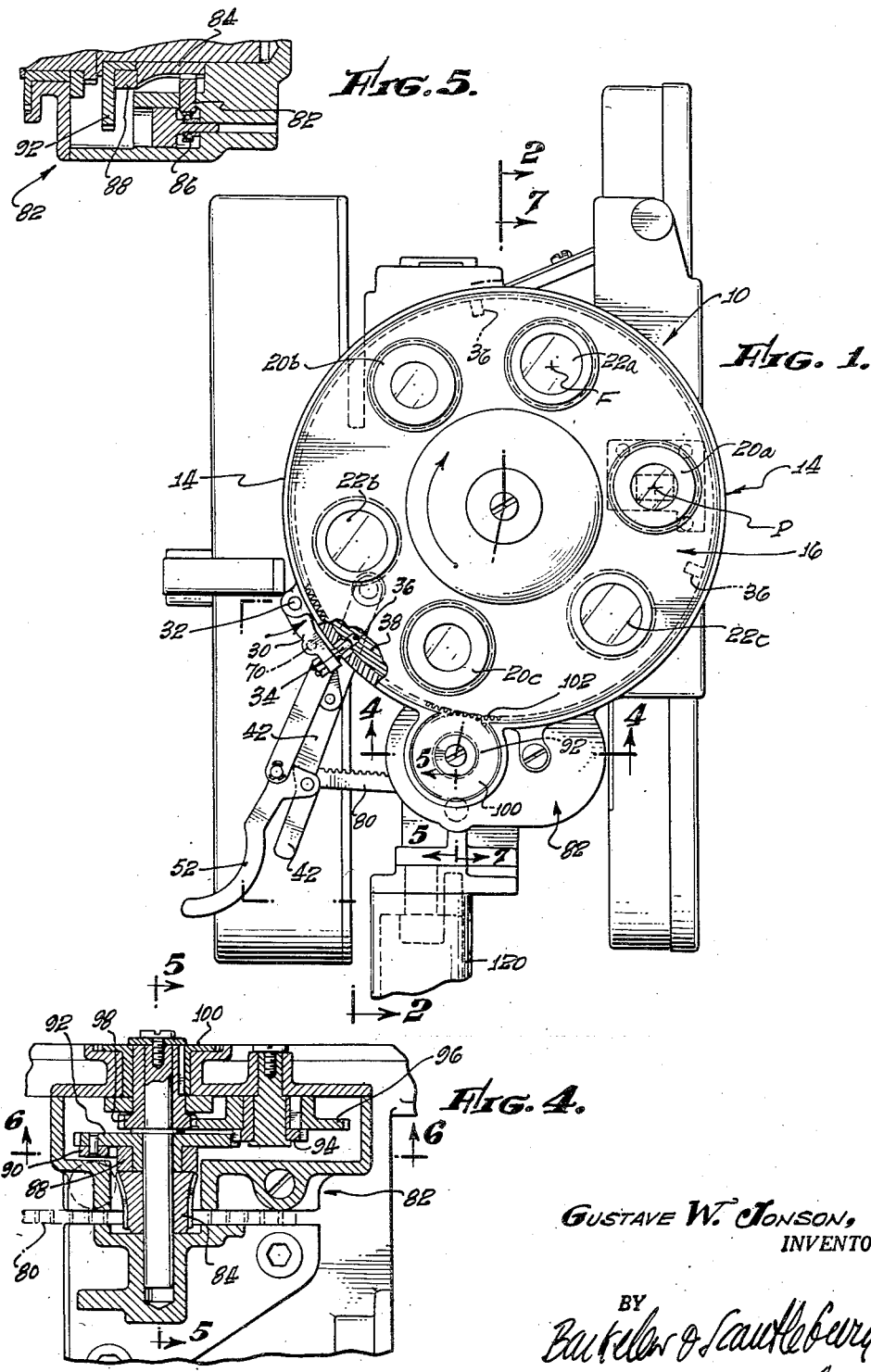
Fig. 1 is a front elevation of a motion picture camera equipped with shift and register mechanism illustrative of the present invention.
Figure 2:
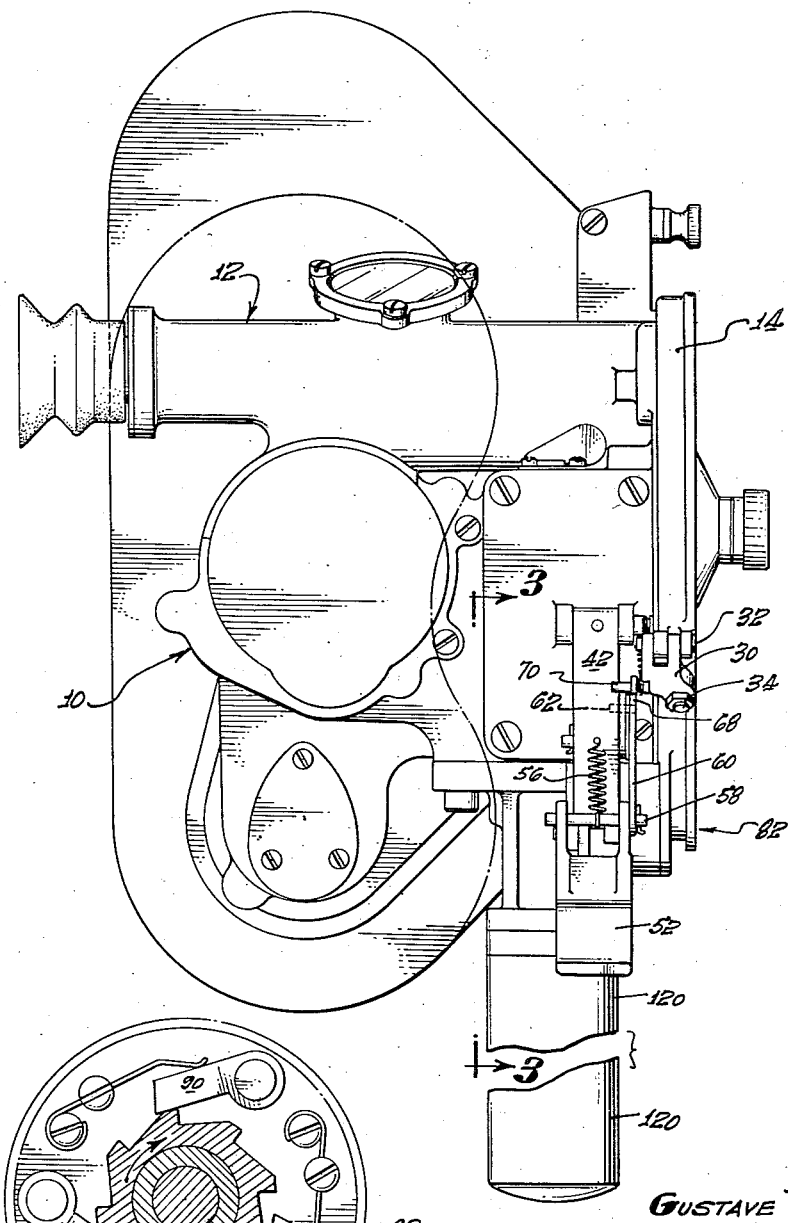
Fig. 2 is a side elevation of the same.

Fig. 7 is a fragmentary section on lines 7—7 of Figs. 1 and 8 showing the turret and the stop mechanism within it; and Fig. 8 is a fragmentary elevation, taken as indicated by line 8—8 on Fig. 7, showing the stop mechanism that is located inside the turret.

The drawings show a typical small motion picture camera having a body casing 10 with which is incorporated a view finder 12 and a turret casing 14. Lens turret 16 is rotatably mounted in casing 14 on a central trunnion 18 (Fig. 7) and carries, in this particular design, three photographic lenses 20 and three corresponding finder lenses 22. In this particular design the three photographic lenses 20 are spaced apart 120° on the turret and the locations of the finder lenses are such that

2 when any photographic lens, say the one at 20a, is aligned on the photographic axis P, then its corresponding finder lens 22a is located on the finder axis F. Substitution of another pair of lenses 20, 22 on those axes, requires, in this particular design, a turret shift of 120° for substituting the next set of lenses 20b, 22b; or two successive 120° shifts for substituting the set 20c, 22c; assuming the turret to be shifted around in the direction indicated by the arrow (clockwise) in Fig. 1.

A swinging arm 30 is pivoted at 32 on the periphery of turret case 14 and carries at its lower swinging end a registration pin 34 adapted to enter any one of the registration notches or other openings 36 in the rim 38 of turret 16. These registration notches are so located that, with pin 34 in any one of them, the turret is registered in position with the corresponding set of lenses 20, 22 on the photographic and finder axes. In this particular design, with three lens sets, there are three registry openings 36 spaced 120° apart. A spring 40 urges arm 30 in the direction indicated by the arrow and urges pin 34 into the registration openings 36, as shown in Figs. 1 and 3.

An operating arm 42 is swingably pivoted at its upper end at 44 on the camera body and is urged outwardly to its normal position (Figs. 1 and 3) by a spring 45. In operation arm 42 swings between that outer position and the inner position shown approximately in Fig. 3b.

Figure 3B:
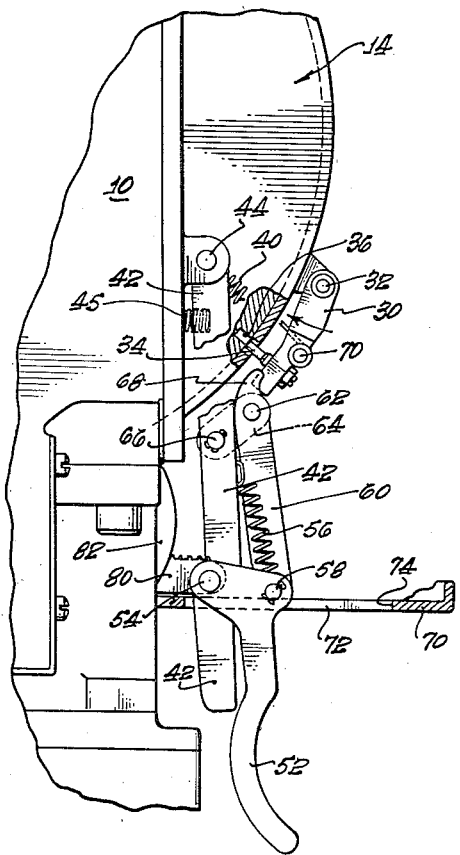

A finger handle 52 is pivoted at 54 at its upper end to operating arm 42 and is normally held in the relative position shown in Figs. 1 and 3 by a spring 56 which acts between 42 and 52. Handle 52 carries a pivot pin 58 located relatively as shown in the drawings, spaced from pivot 54 in a direction generally transverse of the lengths of operating arm 42 and handle 52. A link 60 has its lower end pivoted on pin 58 and at or near its upper end the link is pivotally connected at 62 with a guiding link 64 which is pivoted at 66 on operating arm 42. In normal position (Fig. 3) link 64 extends upwardly and outwardly at a small angle to 42. When handle 52 is moved to the relative position of Figs. 3a and 3b, pulling link 60 down, link 64 swings out from 42 and thus swings the upper end of link 60 out from 42 as shown in those figures. The upper end of link 60 has an upwardly projecting finger 68 which, in the normal position of Fig. 3, lies behind a pin 70 that projects from arm 30. The parts 52, 60 (with finger 68) and 64 are all urged to their normal position of Fig. 3, relative to operating arm 42, by spring 56. They may be stopped in that normal position relative to 42 by any suitable stop; for example, a pivot pin at 62 may contact arm 42.

Any suitable stop arrangement may limit the movement of the parts to the positions of Figs. 3 and 3b. In an actual mechanism the parts are enclosed within a casing with finger handle 52 projecting. A part of such a casing is schematically shown in Figs. 3, 3a and 3b at 70, with a slot at 72 through which the lower ends of 42 and 52 project. In the outward, normal position of the parts, finger handle 52, at a point close to pivot 54 may for instance bring up against the end 74 of that slot. The extreme inner position of the parts is limited, as hereafter described, by stoppage of the turret.

Figure 6:
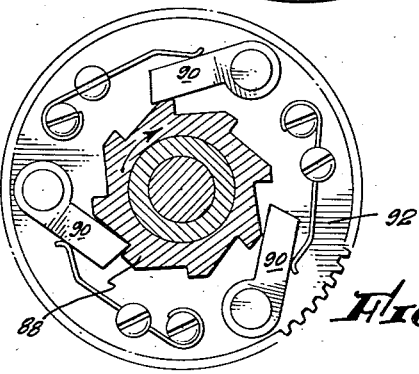
Fig. 6 is an enlarged detail section on line 6—6 of Fig. 4.

A gear rack 80 is pivotally connected to operating arm 42, conveniently at the same pivot 54 on which handle 52 is hung. The gear rack extends into gear box 82 and meshes with the lower side of a pinion 84. The fragmentary detail of Fig. 5 shows the rack meshing with that pinion, held up in mesh by a small ball bearing 86 directly underneath. Pinion 84 drives the toothed ratchet member 88, which, on rotation in the direction indicated by the arrow in Fig. 6, drives ratchet pawls 90 and the gear 92 on which they are mounted. Note that the aspect of Fig. 6 is opposite to that of Fig. 1;

so that, in the aspect of Fig. 1, gear 92 is driven by the ratchet in counter-clockwise direction when rack 80 is moved to the right. Gear 92 meshes with a pinion 94 which directly drives a gear 96; and the latter gear meshes with a pinion 98 that directly drives gear 100. Gear 100 meshes with gear teeth 102 on the periphery of turret 16 (see Fig. 7). The overall gear ratio between gear rack 80 and turret 16 is such that when rack 80 is moved from approximately its normal outer position of Fig. 3 to its inner position shown approximately in Fig. 3b, turret 16 is positively rotated clockwise through an angle of 120°.

After the rack has been moved in (to the right in Fig. 1; to the left in Figs. 3, 3a and 3b) and has positively driven the turret through 120°, it and the other parts shown in Fig. 3 can immediately return to the position of that figure, under the urging of springs 45 and 56, the ratchet element 88, 90 allowing that without rotating the turret. The turret is positively stopped after 120° of rotation, and that stoppage stops the movement of rack 80 and the associated operating parts approximately in the position of Fig. 3b. The turret can be stopped, as will be appreciated from what follows, by the registry pin 34 dropping into the next opening 36 to come around. But due to the desirability of having the registry pin fit the opening snugly, and to obviate wear on the pin and opening, it is preferred to stop the turret with a more rugged stop mechanism. That mechanism is shown in Figs. 7 and 8.

Inside the turret there is a mounting part 100 secured to the back of the turret casing 14. That mounting part carries the turret trunnion 18 and a part 102 that supports a pivot 104 for a rocking arm 106. A ring 108, with three equi-spaced internal stop lugs 110, is secured to the inside of turret 16 and rotates with it. Rocking arm 106 is located within ring 108. The normal position of the arm, and of ring 108, shown in Fig. 8, corresponds to a turret position in which registry pin 34 is in registration engagement with one of the turret rim notches 36. Rocking arm 106 is urged to the position shown in Fig. 8 by a spring 112.

On rotation of the turret clockwise from the position of Fig. 8, the lug designated 110a passes under the raised end 106a of arm 106. As 110a approaches the position 110b it rides up under arm end 106b, raising that end and lowering end 106a into the path of lug 110c which is then approaching position 110a. When lug 110a finally reaches the position 110b, arm 106 can drop down behind it to the normal position of Fig. 8. But, spring 112 being rather light, the turret rotating rapidly, and the clearance at 114 being small, lug 110c brings up against the arm end 106a before it rises. That stops the turret very closely in the registered position in which it is then immediately locked by registry pin 34. In that finally registered position there is a slight clearance between the lugs 110 and both ends of rock arm 106; so the arm then returns to the normal position of Fig. 8 ready for the next shifting operation.

Going back now to Figs. 3 and 3a, b and c, the operation of the parts there shown is now described in detail. In the normal position of Figs. 1 and 3 register pin 34 projects into a registration opening 36, with the turret in a registered position. To shift to the next turret position the operator engages finger handle 52 with a finger and merely pulls on that handle, moving it and the interconnected parts quickly in a single finger movement from the position of Fig. 3 to that shown approximately in Fig. 3b. The small camera that is shown here is a hand camera with a handle 120 for hand holding. The finger handle 52 is at one side of and close to handle 120, in position to be engaged by the index finger of the holding hand, the manual operation of the finger handle being essentially like that of squeezing a gun trigger.

Figure 3C:
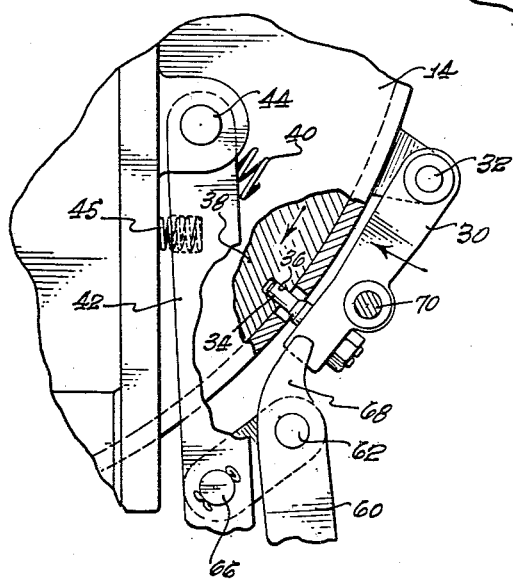
Fig. 3c is a further enlargement of parts of Fig. 3b with certain parts broken away for clarity of illustration, and showing the parts in their final, shifted and registered positions.

The first movement of finger handle 52 is from the position of Fig. 3 to the relative position of Fig. 3a. The inward movement of handle 52 relative to the arm is stopped by 52 contacting arm 42 as shown in Fig. 3a. Spring 45 is strong enough to hold arm 42 out as 52 is pulled in against the tension of spring 56 and the tension of spring 40 on register arm 30. Spring 45 may thus move arm 42 out as handle 52 is pulled in relative to 42, keeping 52 in engagement with slot end 74. In that case arm 42, and rack 80, may start their inward stroke from a position somewhat to the right of that shown in Fig. 3a. But in any case the total stroke of the rack, when the parts have reached approximately the position of Figs. 3b and 3c, positively drives the turret through an angle of 120°.

As shown in Fig. 3a, the first relative movement of finger handle 52 causes finger 68 to move out, engage pin 70, and move arm 30 out to pull register pin 34 out of registration opening 36. The turret is then free to rotate. The immediately succeeding movement of the parts from the position of Fig. 3a to the inner position approximately shown in Fig. 3b, moves rack 80 through its turret driving stroke. During this part of the movement, with finger pressure continuously applied to 52, the parts 52, 68 and 42 maintain the same positions relative to each other. As the parts 42, 68, etc. move inwardly from the position of Fig. 3a, and turret rotation starts, the finger 68 moves in and down toward the position of Fig. 3b. That movement allows register arm 30 and pin 34 to move inwardly until pin 34 is riding the turret periphery, ready to drop into the next opening 36 coming around. Fig. 3b shows the parts in approximately their final positions, with pin 34 riding the periphery and opening 36 just coming into register. Fig. 3c shows the parts in their final position, with pin 34 registering in opening 36, locking the turret in its shifted position.

In the position of the parts shown in Fig. 3b the next register opening 36 is just coming around to pin 34 riding the turret rim. When the opening comes into closely approximate alinement with the register pin, the stop mechanism of Figs. 7 and 8 arrests turret rotation. The register pin then drops into the register opening (Fig. 3c), locking the turret accurately in its shifted position. To insure entry of the register pin, its end may be slightly tapered, as shown in Fig. 3c; and the clearances in the stop mechanism previously spoken of allow for slight final movement of the turret to come finally to accurately registered position with the registry pin completely inserted in the registry opening.

Immediately the parts have reached the position of Fig. 3c, the operator may release the finger handle 52. Upon that release 52 and finger 68 immediately return to the position of Fig. 3 relative to arm 42; so that when that arm moves out to the position of Fig. 3 finger 68 is in the position shown in that figure and does not hold the register pin from moving into the register opening. The parts are then all in the original position of Fig. 3, and a second shift can be then made immediately if desired.

I claim:

1. In combination with a rotatable member mounted for rotation with reference to a frame, a mechanism for shifting the rotatable member between several registered positions and for registering that member in any one of such positions, said mechanism comprising, angularly spaced registry openings in the rotatable member, a registry pin element mounted on the frame for movement inwardly toward and outwardly away from the rotatable member and adapted on inward movement to enter any one of the registry openings, means urging the registry pin element inwardly toward the rotatable member and into a registering opening, an operating arm movably mounted on the frame to move inwardly toward and outwardly away from the frame, generally in directions paralleling the movement directions of the registry pin element, a gear train acting between the operating arm and the rotatable member to drivingly rotate that member in one direction upon movement of the operating arm inwardly toward the frame but allowing outward movement of the operating arm without rotating the rotatable element, means normally holding the operating arm in an outward position, a handle mounted on the operating arm to move inwardly and outwardly with relation to that arm in directions generally parallel to the arm movements, means normally holding the handle in an outward position relative to the arm, a register-pin-lifting element movably mounted on the operating arm, movable inwardly and outwardly with relation to that arm, and adapted, when in an outward position and the arm is in its outward position, to engage the pin element and move it outwardly out of a register opening, and an interconnection between the handle and the pin-lifting element causing that element to move outwardly from the arm to engage and move the pin element outwardly when the operating arm is in its outward position and the handle is moved inwardly.

2. The combination defined in claim 1 and in which the means normally holding the operating arm and the handle normally in outward positions are springs, the spring holding the operating arm out being effectively stronger than the spring holding the handle out, so that the handle can be moved inwardly without necessarily moving the arm inwardly.

3. The combination defined in claim 1 and in which the register pin element and the operating arm are pivotally mounted on the frame.

4. The combination defined in claim 1 and in which the handle is pivotally mounted on the operating arm.

5. The combination defined in claim 1 and in which the operating arm and the register pin element are pivotally mounted on the frame, the handle is pivotally mounted on the operating arm, and the pin-lifting element is part of a link pivotally connected at one end to the handle, and guiding means for the other end of said link with relation to the operating arm.

6. The combination defined in claim 5 and also including stop means independent of the register pin element and acting automatically to stop the rotatable member at the end of each angular movement equal to the angular spacing between adjacent registry openings in said member.

7. The combination defined in claim 1 and also including stop means independent of the register pin element and acting automatically to stop the rotatable member at the end of each angular movement equal to the angular spacing between adjacent registry openings in said member.

References Cited in the file of this patent

UNITED STATES PATENTS

| | | |
|---|---|---|
| 574,223 | Scribner | Dec. 29, 1896 |
| 1,614,001 | Hofstad | Jan. 11, 1927 |

FOREIGN PATENTS

| | | |
|---|---|---|
| 365,901 | Great Britain | Jan. 28, 1932 |
| 458,129 | Germany | Mar. 30, 1928 |